United States Patent
Yim

(10) Patent No.: US 9,669,870 B2
(45) Date of Patent: Jun. 6, 2017

(54) ACTIVE FRONT STEERING SYSTEM FOR VEHICLE

(71) Applicant: HYUNDAI MOBIS CO., LTD., Seoul (KR)

(72) Inventor: Sun Bin Yim, Daejeon (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 14/861,960

(22) Filed: Sep. 22, 2015

(65) Prior Publication Data
US 2016/0083007 A1    Mar. 24, 2016

(30) Foreign Application Priority Data
Sep. 23, 2014    (KR) .......................... 10-2014-0126700

(51) Int. Cl.
*B62D 6/02* (2006.01)
*B62D 6/00* (2006.01)

(52) U.S. Cl.
CPC ............... *B62D 6/02* (2013.01); *B62D 6/002* (2013.01)

(58) Field of Classification Search
CPC .................................. B62D 6/02; B62D 6/002
See application file for complete search history.

(56) References Cited

U.S. PATENT DOCUMENTS

| | | | |
|---|---|---|---|
| 2009/0228173 A1* | 9/2009 | Bolio | B62D 5/008 701/41 |
| 2010/0070137 A1* | 3/2010 | Yamaguchi | B62D 5/008 701/41 |
| 2011/0259663 A1* | 10/2011 | Goutsu | B62D 6/002 180/402 |

FOREIGN PATENT DOCUMENTS

KR    10-2010-0138259 A    12/2010

* cited by examiner

*Primary Examiner* — Aaron L Troost
(74) *Attorney, Agent, or Firm* — Knobbe Martens Olson & Bear LLP

(57) ABSTRACT

An active front steering (AFS) system for a vehicle is disclosed. The AFS system generates a first pinion angle using a steering angle from a steering angle sensor and using an AFS gear ratio corresponding to a vehicle speed. The AFS system generates a second pinion angle corresponding to a steering angle speed. The AFS system generates a pinion angle for steering the vehicle based on the first pinion angle and the second pinion angle.

9 Claims, 5 Drawing Sheets

ACTIVE FRONT STEERING SYSTEM FOR VEHICLE

CROSS-REFERENCES TO RELATED APPLICATIONS

The present application claims priority to Korean application number 10-2014-0126700, filed on Sep. 23, 2014, which is incorporated by reference in its entirety.

BACKGROUND

The present disclosure relates to an active front steering (AFS) system for a vehicle.

The AFS system changes a ratio of a target steering angle to an input steering angle of a driver, according to the change of vehicle speed. The ratio is referred to as a steering ratio. When the vehicle is operated at low speed, the AFS system increases the target steering angle with respect to the input steering angle and thus secures operational convenience. Furthermore, when the vehicle is operated at high speed, the AFS system decreases the target steering angle with respect to the input steering angle, and thus secures high-speed straight traveling stability.

As a result, when the vehicle is operated at low speed, the AFS system applies a relatively large amount of steering even though a driver slightly turns the steering wheel, thereby increasing operational convenience. On the other hand, when the vehicle is operated at high speed, the AFS system applies a relatively small amount of steering even through a driver significantly turns the steering wheel. The related technology of the present invention is disclosed in Korean Patent Laid-open Publication No. 10-2010-0138259 published on Dec. 31, 2010.

SUMMARY

Embodiments of the present invention are directed to an AFS system for a vehicle, which generates a basic pinion angle using an AFS gear ratio, and generates a final pinion angle by adjusting the basic pinion angle based on a steering angle of a driver.

Embodiments of the present invention are directed to an AFS system for a vehicle, which is capable of improving response speed of the vehicle and securing high-speed traveling stability, during sudden steering in an emergency situation.

Embodiments of the present invention are directed to an AFS system for a vehicle, which is capable of generating only a constant amount of additional steering regardless of a steering angle region, thereby securing linearity for vehicle steering.

In one embodiment, an AFS system for a vehicle may include: a basic pinion angle generation unit configured to generate a basic pinion angle with respect to a steering angle of a driver, using an AFS gear ratio for vehicle speed; a compensating pinion angle detection unit configured to detect a compensating pinion angle which is preset for a steering angle speed; and a basic pinion angle adjusting unit configured to receive the basic pinion angle and the compensating pinion angle from the basic pinion angle generation unit and the compensating pinion angle detection unit, respectively, adjust the basic pinion angle using the compensating pinion angle, and output a final pinion angle.

The basic pinion angle generation unit may generate the basic pinion angle using an AFS gear ratio map for vehicle speed.

The basic pinion angle may increase when the vehicle speed is lowered, and decreases when the vehicle speed is raised.

The basic pinion angle generation unit may include: a steering angle sensor configured to sense the steering angle of the driver; a vehicle speed sensor configured to sense the vehicle speed; an AFS gear ratio extractor configured to extract an AFS gear ratio for the vehicle speed sensed through the vehicle speed sensor; and a basic pinion angle calculator configured to calculate the basic pinion angle using the steering angle sensed through the steering angle sensor and the AFS gear ratio extracted through the AFS gear ratio extractor.

The basic pinion angle calculator may calculate the basic pinion angle by multiplying the steering angle sensed through the steering angle sensor by the AFS gear ratio extracted through the AFS gear ratio extractor.

The compensating pinion angle detection unit may limit the detected compensating pinion angle based on an actual pinion angle and vehicle speed.

The compensating pinion angle detection unit may include: a steering angle speed detector configured to detect the steering angle speed using the steering angle of the driver; a pinion angle limiter configured to output a pinion angle limiting ratio corresponding to the actual pinion angle according to a pinion angle limiting ratio which is preset for each actual pinion angle; a vehicle speed limiter configured to output a vehicle speed limiting ratio corresponding to the vehicle speed according to a vehicle speed limiting ratio which is preset for each vehicle speed; and a compensating pinion angle calculator configured to calculate the compensating pinion angle using the steering angle speed, the pinion angle limiting ratio, and the vehicle speed limiting ratio, which are inputted from the steering angle speed detector, the pinion angle limiter, and the vehicle speed limiter, respectively.

The compensating pinion angle calculator may calculate the compensating pinion angle by multiplying the steering angle speed, the pinion angle limiting ratio, and the vehicle speed limiting ratio.

The pinion angle limiting ratio and the vehicle speed limiting ratio may be previously set for each actual pinion angle and vehicle speed, respectively, or calculated in real time.

The basic pinion angle adjusting unit may calculate the final pinion angle by adding the basic pinion angle and the compensating pinion angle.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Generally, an active front steering (AFS) system changes a ratio of a target steering angle to an input steering angle of a driver, according to the change of vehicle speed. The ratio is referred to as a steering ratio. When the vehicle is operated at low speed, the AFS system increases the target steering angle with respect to the input steering angle and thus secures operational convenience. Furthermore, when the vehicle is operated at high speed, the AFS system decreases the target steering angle with respect to the input steering angle, and thus secures high-speed straight traveling stability.

As a result, when the vehicle is operated at low speed, the AFS system applies a relatively large amount of steering even though a driver slightly turns the steering wheel, thereby increasing operational convenience. On the other hand, when the vehicle is operated at high speed, the AFS system applies a relatively small amount of steering even through a driver significantly turns the steering wheel. However, when sudden steering is performed due to a front obstacle during high-speed operation, the AFS system may not perform steering enough to avoid the obstacle, because the AFS system has a small gear ratio.

In one example, the AFS system changes the AFS gear ratio by reflecting a steering angle speed. In a region with a relatively small steering angle, however, the AFS target value is not almost changed. On the other hand, in a region with a large steering angle, the AFS target value is so large that the behavior of the vehicle is destabilized.

Figure 1:
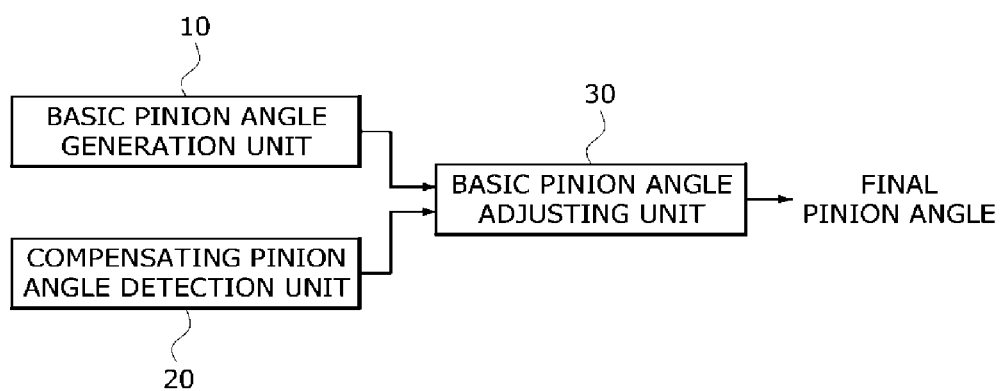
FIG. 1 is a block diagram of an active front steering (AFS) system in accordance with an embodiment of the present invention.
Figure 2:
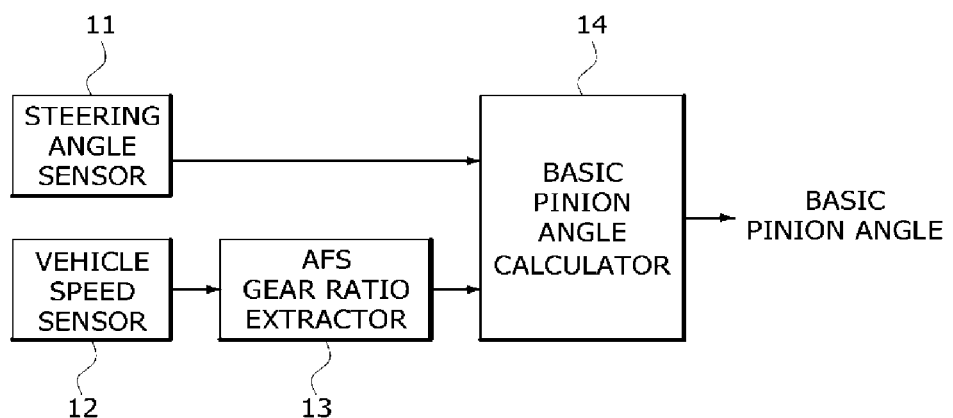
FIG. 2 is a block diagram of a basic pinion angle generation unit in accordance with the embodiment of the present invention.
Figure 3:
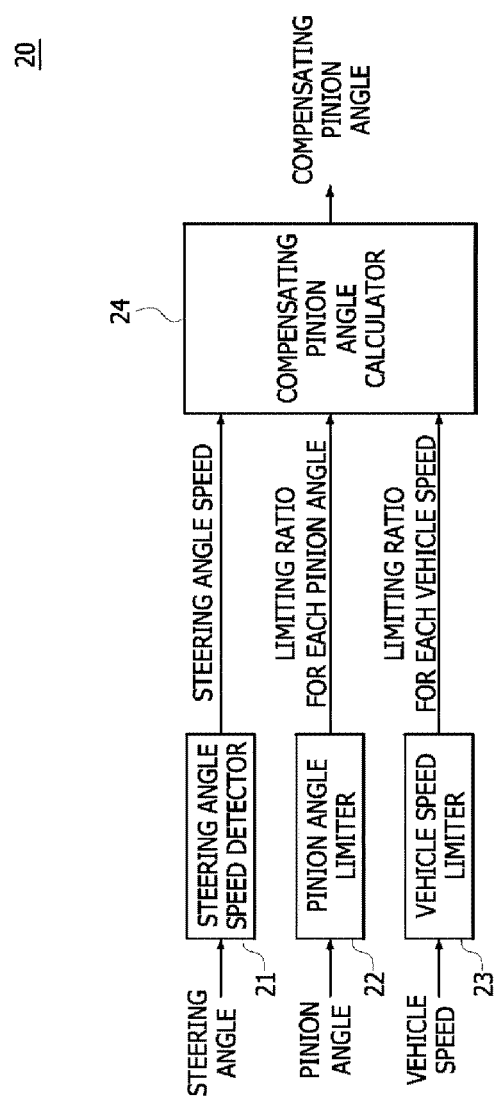
FIG. 3 is a block diagram of a compensating pinion angle detection unit in accordance with the embodiment of the present invention.
Figure 4:
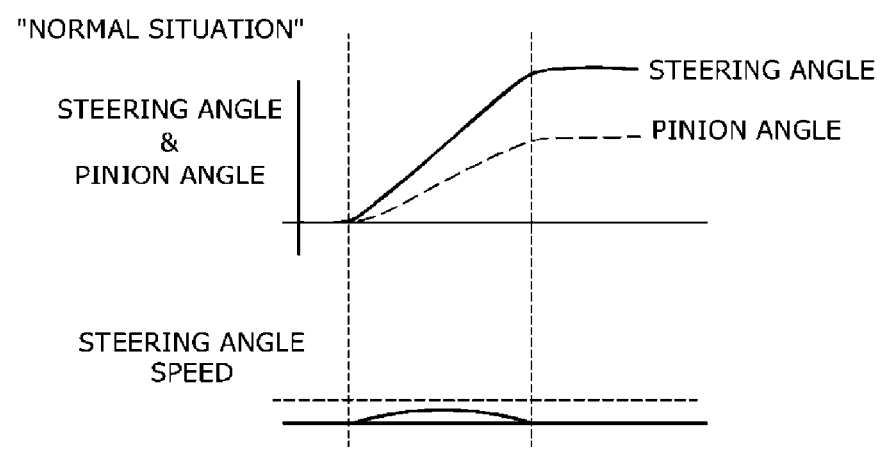
FIG. 4 is a diagram illustrating a pinion angle with respect to a steering angle during a normal situation.
Figure 5:
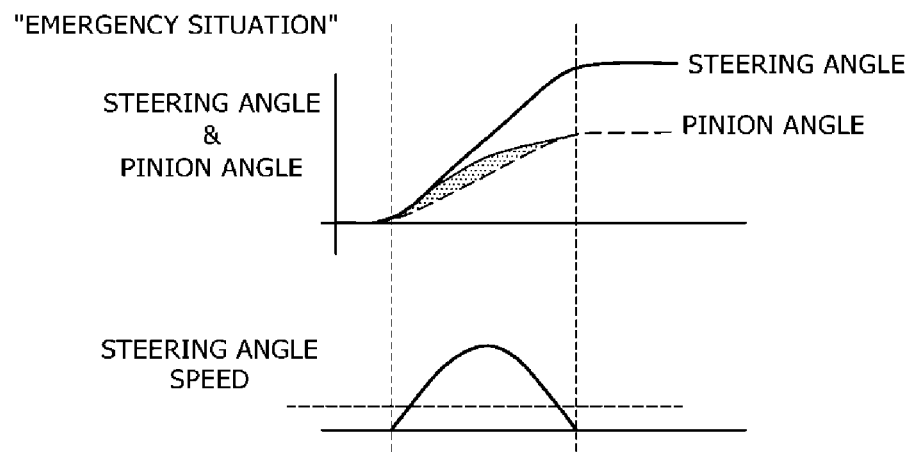
FIG. 5 is a diagram illustrating a pinion angle with respect to a steering angle during an emergency situation.

FIG. 1 is a block diagram of an active front steering (AFS) system in accordance with an embodiment of the present invention. FIG. 2 is a block diagram of a basic pinion angle generation unit in accordance with the embodiment of the present invention. FIG. 3 is a block diagram of a compensating pinion angle detection unit in accordance with the embodiment of the present invention. FIG. 4 is a diagram illustrating a pinion angle with respect to a steering angle during a normal situation. FIG. 5 is a diagram illustrating a pinion angle with respect to a steering angle during an emergency situation.

Referring to FIG. 1, the AFS for a vehicle in accordance with the embodiment of the present invention may include a basic pinion angle generation unit 10, a compensating pinion angle detection unit 20, and a basic pinion angle adjusting unit 30.

The basic pinion angle generation unit 10 may generate a basic pinion angle with respect to a steering angle of a driver, using an AFS gear ratio map for vehicle speed.

As illustrated in FIG. 2, the basic pinion angle generation unit 10 may include a steering angle sensor 11, a vehicle speed sensor 12, an AFS gear ratio extractor 13, and a basic pinion angle calculator 14.

The steering angle sensor 11 may sense a steering angle of the driver.

The vehicle speed sensor 12 may sense the speed of the vehicle. In addition to the vehicle speed sensor 12 to sense the speed of the vehicle using wheel rotation speed, the basic pinion angle generation unit 10 may include various sensors to sense vehicle speed, such as GPS (Global Positioning System).

The AFS gear ratio extractor 13 may extract an AFS gear ratio for the vehicle speed sensed through the vehicle speed sensor 12, from a preset AFS gear ratio map.

The basic pinion angle calculator 14 may calculate a basic pinion angle using the steering angle sensed through the steering angle sensor 11 and the ASF gear ratio extracted through the AFS gear ratio extractor 13. In this case, the basic pinion angle calculator 14 may calculate the basic pinion angle by multiplying the steering angle sensed through the steering angle sensor 11 by the ASF gear ratio extracted through the AFS gear ratio extractor 13.

As described above, the basic pinion angle may be generated on the basis of the preset ASF gear ratio map with respect to vehicle speed. The AFS gear ratio may be changed according to vehicle speed. As a result, when the vehicle is operated at relatively low speed, the basic pinion angle may be increased to secure operational convenience. On the other hand, when the vehicle is operated at relatively high speed, the basic pinion angle may be decreased to improve straight traveling stability.

However, when sudden steering is conducted during high-speed operation, for example, when an obstacle appears at the front during high-speed operation or a driver suddenly steers the steering wheel due to a vehicle abnormality, vehicle steering may be performed at a smaller amount than the steering angle of the driver. Thus, during an emergency situation, it is difficult for the driver to perform steering suitable for operation.

The compensating pinion angle detection unit 20 may generate a compensating pinion angle such that sufficient steering can be performed during the above-described emergency situation, in order to adjust the basic pinion angle through the compensating pinion angle.

The compensating pinion angle detection unit 20 may detect a compensating pinion angle which is preset for a steering angle speed, and limit the detected compensating pinion angle based on an actual pinion angle and vehicle speed.

As illustrated in FIG. 3, the compensating pinion angle detection unit 20 may include a steering angle speed detector 21, a pinion angle limiter 22, a vehicle speed limiter 23, and a compensating pinion angle calculator 24.

The steering angle speed detector 21 may detect a steering angle speed using the steering angle of the driver. For reference, the scope of the present invention may include using a sensor for directly sensing a steering angle speed, as well as detecting a steering angle speed using the steering angle of the driver.

The pinion angle limiter 22 may detect a pinion angle limiting ratio corresponding to an actual pinion angle according to a pinion angle limiting ratio which is preset for each actual pinion angle by a pinion angle sensor, and input the detected pinion angle limiting ratio to the compensating pinion angle calculator 24.

The vehicle speed limiter 23 may detect a vehicle speed limiting ratio corresponding to a vehicle speed according to a vehicle speed limiting ratio which is preset for each vehicle speed, and input the detected vehicle speed limiting ratio to the compensating pinion angle calculator 24.

The pinion angle limiting ratio and the vehicle speed limiting ratio may be previously set for each actual pinion angle and vehicle speed, or calculated in real time.

The compensating pinion angle calculator 24 may calculate a compensating pinion angle using the steering angle speed, the pinion angle limiting ratio, and the vehicle speed limiting ratio, which are inputted from the steering angle speed detector 21, the pinion angle limiter 22, and the vehicle speed limiter 23, respectively. The compensating pinion angle calculator 24 may calculate the compensating pinion angle by multiplying the steering angle speed, the pinion angle limiting ratio, and the vehicle speed limiting ratio.

As such, the compensating pinion angle can be limited according to the actual pinion angle and the vehicle speed, which makes it possible to prevent an unstable behavior of the vehicle, which may occur when steering is excessively performed in a region where steering angle speed is relatively high.

The basic pinion angle adjusting unit 30 may receive the basic pinion angle and the compensating pinion angle from the basic pinion angle generation unit 10 and the compensating pinion angle detection unit 20, respectively, adjust the basic pinion angle using the compensating pinion angle, and output a final pinion angle. In this case, the basic pinion angle adjusting unit 30 may calculate the final pinion angle by adding the basic pinion angle and the compensating pinion angle.

Hereafter, processes of outputting a final pinion angle through a steering angle and a pinion angle during a normal situation and an emergency situation, respectively, will be described with reference to FIGS. 4 and 5.

As illustrated in FIG. 4, a compensating pinion angle may not be reflected in a normal situation, that is, in a state where a steering angle speed is relatively low. Thus, a basic pinion angle to which the AFS gear ratio is reflected may appear as a final pinion angle.

However, during an emergency situation as illustrated in FIG. 5, that is, in a state where a steering angle speed is relatively high, a basic pinion angle may be adjusted through a compensating pinion angle, and outputted as a final pinion angle (solid region).

Thus, during the emergency situation, that is, when the steering angle speed is relatively high, the compensating pinion angle may be reflected more than during the normal situation. Then, during high-speed operation, sufficient steering may be performed to improve the response characteristic of the vehicle.

Furthermore, the compensating pinion angle may be limited on the basis of an actual pinion angle and vehicle speed, such that steering is not excessively performed. Then, during an emergency situation, the behavior of the vehicle can be stabilized.

In accordance with the embodiment of the present invention, the AFS system may generate a basic pinion angle using the AFS gear ratio map, and generate a final pinion angle by adjusting the basic pinion angle based on a steering angle speed of a driver.

Furthermore, when sudden steering is performed in an emergency situation, the AFS system can improve the response speed of the vehicle, and secure high-speed traveling stability.

Furthermore, the AFS system may generate a constant amount of additional steering regardless of the steering angle region, thereby securing the linearity for vehicle steering.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An active front steering (AFS) system for a vehicle, the AFS system configured to generate a basic pinion angle with respect to a steering angle of a driver using an AFS gear ratio that is determined based on a vehicle speed;
   wherein the AFS system comprises:
      a steering angle speed detector configured to detect the steering angle speed from the steering angle,
      a pinion arise limiter configured to output a pinion angle limiting ratio predetermined for a pinion angle,
      a vehicle speed limiter configured to output a vehicle speed limiting ratio predetermined for the vehicle speed, and
      a compensating pinion angle calculator configured to calculate a compensating pinion angle using the steering angle speed, the pinion angle limiting ratio, and the vehicle speed limiting ratio,
   wherein the AFS system is configured to output an adjusted pinion angle using the basic pinion angle and the compensating pinion angle.

2. The AFS system of claim 1, wherein the AFS system is configured to generate the basic pinion angle using an AFS gear ratio map for vehicle speed.

3. The AFS system of claim 2, wherein the AFS system is configured to increase the basic pinion angle when the vehicle slows down, and is further configured to decrease the basic pinion angle when the vehicle accelerates.

4. The AFS system of claim 1, further comprising:
   a steering angle sensor configured to sense the steering angle;
   a vehicle speed sensor configured to sense the vehicle speed;
   an AFS gear ratio extractor configured to extract the AFS gear ratio corresponding to the vehicle speed sensed through the vehicle speed sensor; and
   a basic pinion angle calculator configured to calculate the basic pinion angle using the steering angle sensed through the steering angle sensor and the AFS gear ratio extracted through the AFS gear ratio extractor.

5. The AFS system of claim 4, wherein the basic pinion angle calculator is configured to calculate the basic pinion angle by multiplying the steering angle sensed through the steering angle sensor by the AFS gear ratio extracted through the AFS gear ratio extractor.

6. The AFS system of claim 1, wherein the compensating pinion angle calculator is configured to calculate the compensating pinion angle by multiplying the steering angle speed, the pinion angle limiting ratio, and the vehicle speed limiting ratio.

7. The AFS system of claim 1, wherein the pinion angle limiting ratio and the vehicle speed limiting ratio are previously set for each actual pinion angle and vehicle speed, respectively, or calculated in real time.

8. The AFS system of claim 1, wherein the adjusted pinion angle is computed by adding the basic pinion angle and the compensating pinion angle.

9. The AFS system of claim 1, wherein the compensating pinion angle calculator is configured to calculate the compensating pinion angle by multiplying the steering angle speed, the pinion angle limiting ratio, and the vehicle speed limiting ratio.

* * * * *